(12) United States Patent
Yang et al.

(10) Patent No.: US 9,647,713 B2
(45) Date of Patent: May 9, 2017

(54) SMART ULTRA BOX, PROTECTIVE CASE AND MOBILE PHONE PROTECTIVE CASE WITH THE SAME

(71) Applicant: MOBILECONN TECHNOLOGY CO.,LTD, New Taipei (TW)

(72) Inventors: Chung-Kai Yang, New Taipei (TW); Chin-Tien Lin, Taipei (TW)

(73) Assignee: MOBILECONN TECHNOLOGY CO.,LTD., New Taipei (TW)

( * ) Notice: Subject to any disclaimer, the term of this patent is extended or adjusted under 35 U.S.C. 154(b) by 0 days.

(21) Appl. No.: 15/050,052

(22) Filed: Feb. 22, 2016

(65) Prior Publication Data

US 2017/0019139 A1    Jan. 19, 2017

(30) Foreign Application Priority Data

Jul. 13, 2015   (TW) .............................. 104211233 U

(51) Int. Cl.
*H04M 1/00* (2006.01)
*H04B 1/3888* (2015.01)
*H04M 1/02* (2006.01)

(52) U.S. Cl.
CPC ........ *H04B 1/3888* (2013.01); *H04M 1/0254* (2013.01); *H04M 1/0274* (2013.01); *H04M 1/0277* (2013.01)

(58) Field of Classification Search
USPC ............. 455/550.1, 572, 575.8, 343.1–343.6
See application file for complete search history.

(56) References Cited

U.S. PATENT DOCUMENTS

| | | | | |
|---|---|---|---|---|
| 5,717,307 A | * | 2/1998 | Barkat ................. | H01M 10/44 307/125 |
| 8,634,887 B2 | * | 1/2014 | Hu ........................ | G06F 1/1628 455/575.8 |
| 8,646,698 B2 | * | 2/2014 | Chen .................... | H04B 1/3888 235/435 |
| 2010/0231395 A1 | * | 9/2010 | Chen ....................... | G06F 1/266 340/636.2 |
| 2011/0177852 A1 | * | 7/2011 | Jain .................. | G06K 19/07739 455/575.8 |
| 2013/0063873 A1 | * | 3/2013 | Wodrich ............... | G06F 1/1635 361/679.01 |
| 2013/0206844 A1 | * | 8/2013 | Chen .................... | H04B 1/3888 235/492 |

(Continued)

*Primary Examiner* — Fayyaz Alam
(74) *Attorney, Agent, or Firm* — Li & Cai Intellectual Property (USA) Office

(57) ABSTRACT

A smart ultra box adapting to a protective case is disclosed. The protective case can be assembled with a power bank to form a mobile phone protective case. The power bank provides an identification unit. The ultra box includes a main body, a conversion unit, a flexible printed circuit board, a processing unit and a memory unit. The processing unit connects to the conversion unit. The memory unit, connected to the processing unit, stores at least one PIN information. When the protective case assemble with the power bank, the ultra box according to the PIN information determines whether the identification unit is a real identification code of the processing unit; if not, the power bank stops power supply by the processing unit controlled; on the contrary, if yes, the power bank starts power supply by the processing unit controlled.

12 Claims, 4 Drawing Sheets

(56) References Cited

U.S. PATENT DOCUMENTS

| | | | |
|---|---|---|---|
| 2015/0185771 A1* | 7/2015 | Clark .................. | H02K 7/1861 320/137 |
| 2015/0280770 A1* | 10/2015 | Rhee ................... | H04B 1/3888 455/575.8 |
| 2016/0126999 A1* | 5/2016 | Endo ..................... | H01Q 1/243 455/572 |
| 2016/0181860 A1* | 6/2016 | Partovi ................. | H02J 7/025 320/108 |

* cited by examiner

SMART ULTRA BOX, PROTECTIVE CASE AND MOBILE PHONE PROTECTIVE CASE WITH THE SAME

BACKGROUND

1. Technical Field

The present disclosure is related to a smart ultra box, a protective case with the same smart ultra box and a mobile phone protective case. Especially, this present disclosure is suitable for a mobile communication device.

2. Description of Related Art

In today's market, a power bank usually includes a storage battery and control circuit board in a main body of the power bank, and configures at least a USB transmission interface on the main body. When charging, power stored in the storage battery can be converted by the control circuit board into the appropriate voltage and current. Then, the appropriate voltage and current are provided to a user's mobile device via the USB transmission interface. With the high market growth of smart phones, tablet computers and other mobile devices, and mobile devices developing toward big screen and multi-core, power consumption has increased significantly. In recent years, power bank demand has greatly grown to keep up with the development of simulated actions of the mobile devices.

However, whether smart phones or tablet computers, these operations typically require additional power supply transmission lines to transmit power; moreover, when the power of the battery has run down, this kind of power bank needs a power transformer charger to recharge. That is, users need to carry the power bank, the power supply transmission lines and the power transformer when going out, which is quite troublesome and inconvenient.

SUMMARY

The instant disclosure provides a smart ultra box and its protective case, which is used for charging and protecting a mobile communication device through an assembled design with a power bank and the protective case.

The instant disclosure provides a smart ultra box, adapted to a protective case. The protective case protects a mobile communication device, and can be assembled with a power bank to form a mobile phone protective case. The power bank includes an identification unit. The smart ultra box includes a main body, a conversion unit, a flexible printed circuit board, a processing unit and a memory unit. The conversion unit disposes on the main body. The flexible printed circuit board electrically connects to the conversion unit, extending outwardly from the main body. The processing unit disposes on the main body and electrically connects to the conversion unit. The memory unit disposes on the main body and electrically connects to the processing unit. The memory unit stores at least one personal identification number (PIN) information. When the protective case and the power bank are assembled with each other, the ultra box according to the PIN information determines whether the identification unit is a real identification code of the processing unit. If the identification unit is determined not to be the real identification code, the power bank stops power supply by the processing unit controlled in response to the determination order. If the identification unit is determined to be the real identification code, the power bank starts power supply by the processing unit controlled in response to the determination order.

The instant disclosure provides a protective case. The protective case protects a mobile communication device, and is assembled with a power bank to form a mobile phone protective case. The power bank includes an identification unit. The protective case includes an accommodating portion and a smart ultra box. The accommodating portion houses the mobile communication device. The smart ultra box disposes on an outer side of the accommodating portion.

The instant disclosure provides a mobile protective case, protecting a mobile communication device. The mobile phone protective case includes a protective case, a power bank and a smart ultra box. The protective case has an accommodating portion and a first connecting portion. The accommodating portion is for housing the mobile communication device. The power bank is used to assemble with the protective case. And the smart ultra box disposes on an outer side of the accommodating portion.

To sum up, the exemplary embodiments of the present disclosure provide a smart ultra box, a protective case with the same ultra box and a mobile phone protective case, for charging and protecting a mobile communication device through an assembled design with a power bank and the protective case. Wherein, the protective case is for housing the mobile communication device, which can be a smart phone, to make the mobile communication device get the best protection effect. The present disclosure really enhances the ease of operation, efficiency and quality of the smart ultra box and its protective case.

In order to further understand the techniques, means and effects of the present disclosure, the following detailed descriptions and appended drawings are hereby referred to, such that, and through which, the purposes, features and aspects of the present disclosure can be thoroughly and concretely appreciated; however, the appended drawings are merely provided for reference and illustration, without any intention to be used for limiting the present disclosure.

BRIEF DESCRIPTION OF THE DRAWINGS

The accompanying drawings are included to provide a further understanding of the present disclosure, and are incorporated in and constitute a part of this specification. The drawings illustrate exemplary embodiments of the present disclosure and, together with the description, serve to explain the principles of the present disclosure.

DESCRIPTION OF THE EXEMPLARY EMBODIMENTS

Figure 1:
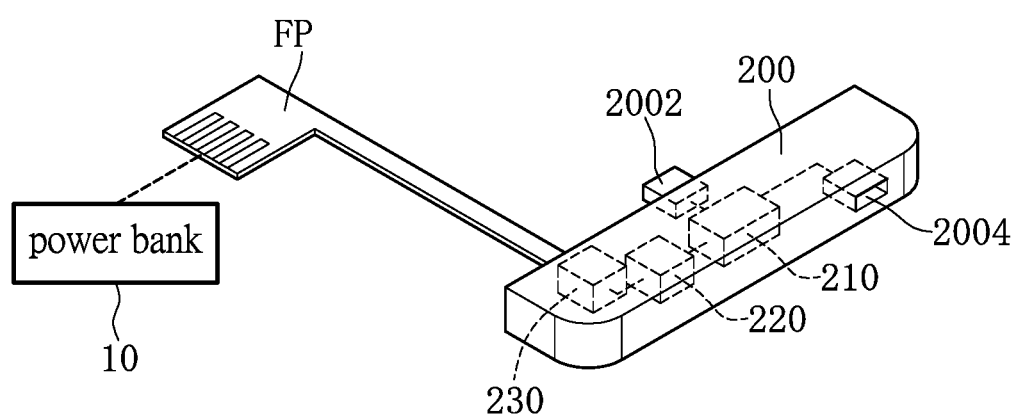
FIG. 1 is a schematic diagram of a smart ultra box according to an exemplary embodiment of the instant disclosure.

Example embodiments will be described below in more detail with reference to the accompanying drawings. Many different forms and embodiments are possible without deviating from the spirit and teachings of this disclosure and so the disclosure should not be construed as limited to the embodiments set forth herein. Rather, these embodiments are provided so that this disclosure will be thorough and complete, and will fully convey the scope of the disclosure to those skilled in the art. In the drawings, the sizes and relative sizes of layers and regions may be exaggerated for clarity. Like reference numbers refer to like elements throughout.

It will be understood that, although the terms first, second, third, and the like, may be used herein to describe various elements, components, regions, layers and/or sections, these elements, components, regions, layers and/or sections should not be limited by these terms. These terms are only to distinguish one element, component, region, layer or section from another region, layer or section discussed below and hence, a first element, component, region, layer or section may be termed as a second element, component, region, layer or section without departing from the teachings of the present disclosure. As used herein, the term "and/or" includes any and all combinations of one or more of the associated listed items.

The following is to describe a smart ultra box and protective case thereof via a plurality of embodiments with corresponding drawings. However, the embodiments below are not for restricting the scope of the instant disclosure.

Please refer to FIG. 1, which is a schematic diagram of a smart ultra box according to an exemplary embodiment of the instant disclosure. The smart ultra box 20 is adapted to a protective case. The protective case is for protecting a mobile communication device 9, and assembled with a power bank 10 to form a mobile phone protective case 1. For convenience of explanation, the power bank 10 uses a protective cover plate of the mobile phone protective case 1 to illustrate, but the present disclosure does not limit states of the protective case.

The power bank 10 includes an identification unit ID. The identification unit ID implements through an identification chip, an identification bar code, an identification circuit or an identification firmware. The identification unit ID provides a product identification code, a battery identification number, a manufacturer identification code or other identification codes for the power bank 10. And the above identification codes can be transmitted to the smart ultra box 20 via wired or wireless technologies. The above identification codes via radio frequency technology to transmit to the smart ultra box 20. Or the above identification codes via a signal transmission channel of the wired circuit to transmit to the smart ultra box 20. Thereby, the smart ultra box 20 determines the authenticity of the above identification codes.

For convenience of explanation, the memory unit 230 stores at least one personal identification number (PIN) information which is used for determining the authenticity of the above identification codes. That is, if the above identification codes are in line with the PIN information stored in the memory unit 230, the processing unit 220 determines that the power bank 10 has a real identification code, and the power bank 10 starts the power supply by the processing unit 220 controlled in response to the determination order. On the contrary, if the above identification code is not in line with the PIN information stored in the memory unit 230, the processing unit 220 determines that the power bank 10 does not have a real identification code. Then, the power bank 10 stops the power supply by the processing unit 220 controlled in response to the determination order. The above disclosure is not intended to limit the smart ultra box 20 of the present invention.

The smart ultra box 20 includes a main body 200, a conversion unit 210, a flexible printed circuit board FP, a processing unit 220 and a memory unit 230. The smart ultra box 20 is a platform used to determine the authenticity of the power bank 10. In addition, the smart ultra box 20 transmits electric power via the flexible printed circuit board FP. The flexible printed circuit board FP extends outwardly from the main body 200. On the other hand, the smart ultra box 20 is a platform used as an external power supply to the mobile communication device. The above disclosure is not intended to limit the smart ultra box 20 of the present invention.

The main body 200 includes an output interface 2002 and an external power interface 2004. The output interface 2002 electrically connects a mobile communication device, and the external power interface 2004 electrically connects an external power source. The output interface 2002 is a power connection port or a USB connection port used for electrically connecting a transmission opening, charging opening or charging structure of the mobile communication device. The external power interface 2004 connects the power connection port to receive a commercial power source from the external power source. That is, the commercial power source enters to the conversion unit 210 via the external power interface 2004. After the conversion unit 210 converts the commercial power source, the main body 200 outputs power to the mobile communication device via the output interface 2002.

The conversion unit 210 disposes on the main body 200, to electrically connect the output interface 2002 and the external power interface 2004. Substantively, the conversion unit 210 implements through an alternating current (AC) to direct current (DC) converting circuit, a direct current (DC) to direct current (DC) converting circuit and/or a combination of one or more thereof. The above disclosure is not intended to limit the conversion unit 210 of the present invention.

The flexible printed circuit board FP electrically connects to the conversion unit 210. The flexible printed circuit board FP extends outwardly from the main body 200. The external power interface 2004 receives a commercial power source. Then, the conversion unit 210 converts the commercial power source into a first electric power and a second electric power. The output interface 2002 outputs the first electric power, and the flexible printed circuit board FP transmits the second electric power.

The smart ultra box 20 receives a 110 volt alternating current (AC) via the external power interface 2004. A power adapter connects between the commercial power source and the external power interface 2004. Wherein, the power adapter has a circuit design which is an alternating current (AC) to direct current (DC) converting circuit. Thereby, the power adapter transmits a direct current power to the smart ultra box 20. Since the direct current power enters the ultra box 20 from the external power interface 2004, and the conversion unit 210 is a direct current (DC) to direct current (DC) converting circuit, the conversion unit 210 converts the direct current power into a first electric power in line with the electricity of the smart phone. Then, the output interface 2002 outputs the first electric power to the mobile communication device. Additionally, the conversion unit 210 converts the direct current power into a second electric power in line with the electricity of a power bank 10. And the flexible printed circuit board FP transmits the second electric power to the power bank 10.

In another embodiment of the instant disclosure, when the power adapter does not have a circuit design which can act as an alternating current (AC) to direct current (DC) converting circuit, the conversion unit 210 can serve as an alternating current (AC) to direct current (DC) converting circuit when an alternating current power enters the ultra box 10 from the external power interface 2004. The conversion unit 210 converts the alternating current power to a direct current power, and processes the direct current power using components such as rectifiers, regulators and transformers, etc. Thence, the conversion unit 210 outputs the first electric power via the output interface 2002, and transmits the second electric power via the flexible printed circuit board FP. The above disclosure is not intended to limit the smart ultra box 20 of the present invention.

The processing unit 220 disposes on the main body 200, to electrically connect the conversion unit 210. The processing unit 220 implements through a processor, a microprocessor, a control circuit with semiconductor electronic components, a processing circuit or a judging circuit. The above disclosure is not intended to limit the processing unit 220 of the present invention.

The memory unit 230 disposes on the main body 200, to electrically connect the conversion unit 210. The memory unit 230 stores at least one personal identification number (PIN) information. The memory unit 230 is a secure digital memory card (SD Card), a flash memory, a non-volatile memory, a volatile memory, and/or a combination of one or more thereof. The above disclosure is not intended to limit the memory unit 230 of the present invention.

The memory unit 230 stores one or more than one personal identification number (PIN) information. The personal identification number (PIN) information is such as a one-dimensional bar code (1D Barcode), a two-dimensional bar code (2D Barcode), a three-dimensional bar code (3D Barcode), a customized identification code by manufacturer, or other identification code information. Wherein, a plurality of personal identification number (PIN) information can be formed into an identification code database. The above disclosure is not intended to limit the personal identification number information of the present invention.

Since the protective case and the power bank 10 assemble with each other, the processing unit 220 according to the PIN information determines whether the identification unit ID is a real identification code. If the identification unit ID is determined not to be the real identification code, the power bank 10 stops the power supply by the processing unit 220 controlled in response to the determination order. Otherwise, if the identification unit ID is determined to be the real identification code, the power bank 10 starts the power supply by the processing unit 220 controlled in response to the determination order. That is, the processing unit 220, according to the determination result, controls the power bank 10 to supply power or not. The above determination result is a judgment according to at least one PIN information comparing the identification unit ID of the power bank 10.

Figure 2:
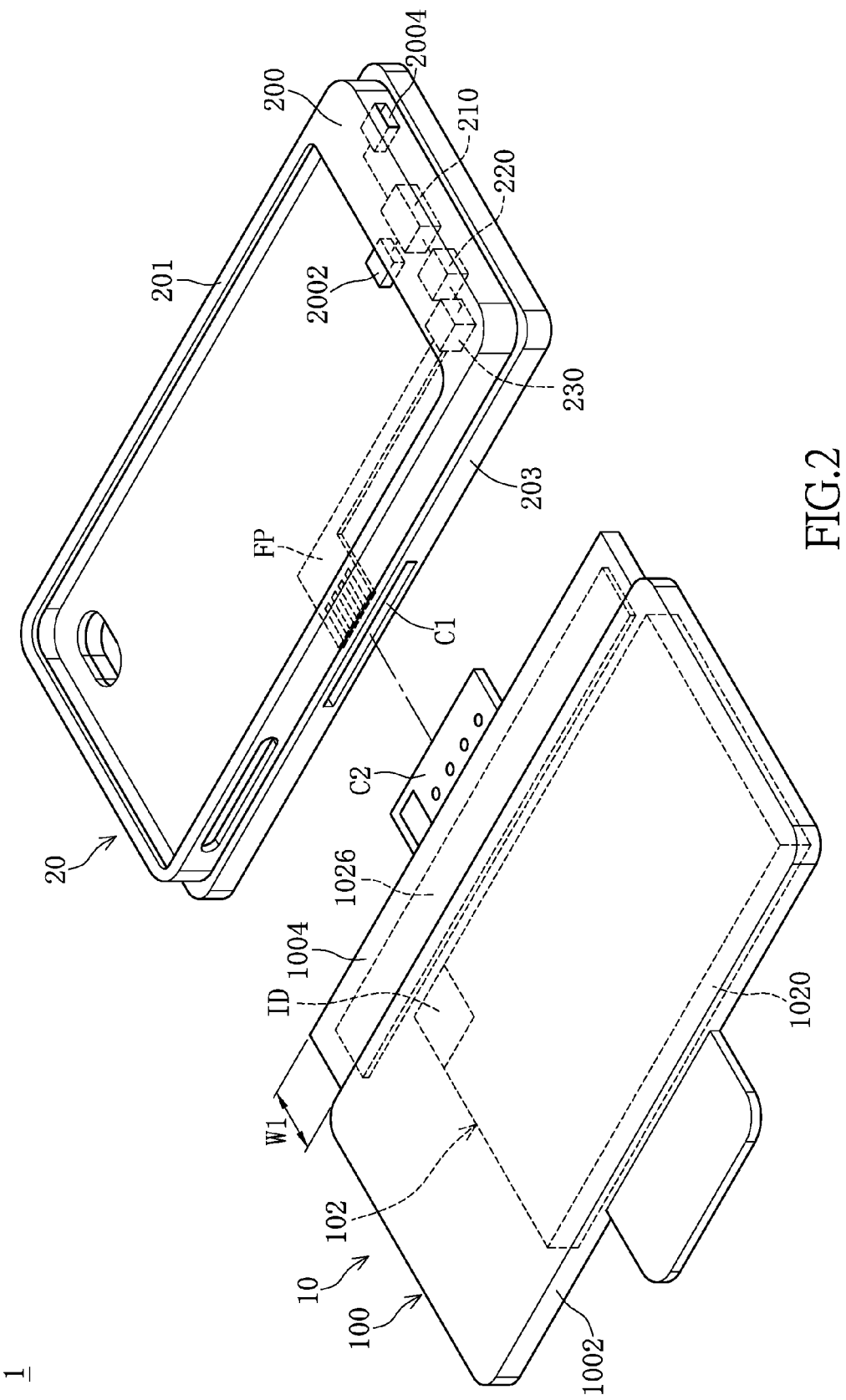
FIG. 2 is a schematic diagram of a mobile protective case according to FIG. 1 provided in accordance with the exemplary embodiment of the present disclosure.

FIG. 2 is a schematic diagram of a mobile protective case according to FIG. 1 provided in accordance with the exemplary embodiment of the present disclosure. As shown in FIG. 1 and FIG. 2, there is a mobile protective case 1 adapted to protect a mobile communication device. The mobile protective case 1 includes a protective case, a power bank 10 and a smart ultra box 20. The protective case includes an accommodating portion 201 and a first connecting portion C1. The accommodating portion 201 houses the mobile communication device. The power bank 10 is assembled with the protective case. The ultra box 20 disposes on an outer side of the accommodating portion 201.

For convenience of explanation, the protective case and the ultra box 20 of the present embodiment is an integrated design. In another embodiment, the ultra box 20 and the protective case can be an assembled design. The above disclosure is not intended to limit the ultra box 20 and the protective case of the present invention.

The mobile communication device is removably disposed on the accommodating portion 201. The mobile communication device is a smart phone, a tablet computer or a personal digital assistant (PDA). For convenience of explanation, the mobile communication device of the present disclosure uses a mobile phone to illustrate, but the present disclosure does not limit the mobile communication device.

The protective case and the power bank 10 are assembled with each other to form a mobile phone protective case 1. The protective case includes a bottom plate portion 203, an accommodating portion 201 and a first connecting portion C1. The first connecting portion C1 disposes on the bottom plate portion 203. The accommodating portion 201 connects to the bottom plate portion 203. The protective case of the present embodiment can be regarded as a mobile phone protective case 1. The accommodating portion 201 is for housing the mobile phone. Wherein, the accommodating portion 201 configures a camera lens opening, a phone keypad opening, a charging opening, or other openings. Thus, all features and functions of the smart phone are completely usable through the openings of the accommodating portion 12. The above disclosure is not intended to limit the protective case of the present invention.

The bottom plate portion 203 is an outer casing of the protective case. The flexible printed circuit board FP extends to a first connecting portion C1 from the outer casing. A terminal of the flexible printed circuit board FP electrically connects to the first connecting portion C1. In other embodiments, the first connecting portion C1 can be disposed on any outer side of the accommodating portion 201. Thus, the power bank 10 assembles with the accommodating portion 12 to form the mobile phone protective case 1 with a protective cover. A person of ordinary skill in the art could design positions of the first connecting portion C1 freely.

A second connecting portion C2 electrically connects to the first connecting portion C1. The first connecting portion C1 and the connecting portion C2 of the present embodiment respectively have a magnetic button assembly. The second connecting portion C2 is an electromagnet used for generating mutual magnetic attraction with the first connecting portion C1 when the electromagnet is energized. In other embodiments, the second connecting portion C2 can be a power connection port or a data transmitting port. The above disclosure is not intended to limit the first connecting portion C1 and the second connecting portion C2 of the present invention.

The second connecting portion C2 electrically connects to the first connecting portion C1 via engaging, mating, magnetic snapping or otherwise. Since the second connecting portion C2 electrically connects to the first connecting portion C1, a power module 102 transmits electric power to the mobile phone via the second connecting portion C2 and the first connecting portion C1. That is, due to the second connecting portion C2 assembling with the first connecting portion C1, the power module 102 supplies power to the mobile phone.

The accommodating portion 201 includes an output interface 2002 and an external power interface 2004. The output interface 2002 disposes on the inner side of the accommodating portion 201. The external power interface 2004 disposes on the outer side of the accommodating portion 201. The flexible printed circuit board FP electrically connects between the output interface 2002 and the external power interface 2004, to construct a power transmission path between the first connecting portion C1 and the mobile phone. Therefore, after the protective cover of the power bank 10 is assembled with the protective case, the power bank 10 supplies power to the mobile phone.

The external power interface 2004 electrically connects an external power source to receive a commercial power source, and converts the commercial power source into an electrical power in line with the electricity of the mobile phone, the power bank 10 and/or a combination of one or more thereof. That is, the mobile phone protective case 1 of the present embodiment charges the mobile phone, the power bank 10 and/or a combination of one or more thereof.

The power bank 10 includes a cover plate assembly 100 and a power module 102. The cover plate assembly 100 includes a lid portion 1002, a folded portion 1004 and a second connecting portion C2. The folded portion 1004 is connected between the lid portion 1002 and the second connecting portion C2. The cover plate assembly 100 is an upper cover plate of the mobile phone protective case 1, to cover a touch screen or display screen of the mobile phone. The above disclosure is not intended to limit the cover plate assembly 100 of the present invention.

The folded portion 1004 has a width W1 which is greater than a thickness of the mobile phone. The lid portion 1002 is used to cover the touch screen or display screen of the mobile phone. The area of the lid portion 1002 is larger than the area of the folded portion 1004. The folded portion 1004 is a rotation structure, pivoting structure or folded structure for connecting between the lid portion 1002 and the protective case. The second connecting portion C2 is used for connecting or assembling with the protective case. The above disclosure is not intended to limit the lid portion 1002, the folded portion 1004 and the second connecting portion C2 of the present invention.

The lid portion 1002 revolves and covers the accommodating portion 201 via the folded portion 1004. That is, the lid portion 1002 is used to cover the accommodating portion 201. And the lid portion 1002 revolves to a cover plate position via the folded portion 1004. The cover plate position is a relative position of the lid position 1002 with respect to the accommodating portion 201. In addition, the cover plate assembly 100 is for assembling with the protective case. The cover plate assembly 100 and the protective case assemble with each other to form a mobile phone protective case 1 with a protective cover plate.

On the other hand, when the lid portion 1002 covers a touch screen of the mobile phone, the folded portion 1004 disposes on the mobile phone side, and the width W1 of the folded portion 1004 is greater than a thickness of the mobile phone (as shown in FIG. 2). When the lid portion 1002 uncovers the touch screen of the mobile phone, the touch screen is exposed. The folded portion 1004 extends from the protective case and connects to the lid portion 1002. Whereby, the lid portion 1002 revolves with respect to the position of the protective case. That is, the lid portion 1002 can cover or expose the touch screen via the folded portion 1004.

Additionally, the cover plate assembly 100 and the protective case respectively are nano-materials, environmental protection materials, plastic materials, leather, cloth, paper, metal, or other mineral materials. The cover plate assembly 100 and the protective case provide features such as anti-dust, anti-scratch, anti-bump and waterproofing, etc. Thereby, the cover plate assembly 100 and the protective case avoid dust accumulation or damage to openings and connecting ports of the mobile phone.

The cover plate assembly 100 and the protective case assemble with each other to form a mobile phone protective case 1. The power module 102 configures to the cover plate assembly 100. The power module 102 provides power to the mobile phone via a combination of the first connecting portion C1 and the second connecting portion C2.

When the cover plate assembly 100 and the protective case are in a separate state and unconnected, the cover plate assembly 100 can be regarded as a separate power bank. When the cover plate assembly 100 and the protective case are in a connected state, the cover plate assembly 100 can be regarded as a protective cover of the mobile phone. The cover plate assembly 100 and the protective case are used for covering the mobile phone, or to make the touch screen of the mobile phone exposed. Charging power of the power module 102 through the first connecting portion C1 and the second connecting portion C2 transmits to the mobile phone. Whereby, the cover plate assembly 100 can be regarded as a power bank of the mobile phone.

For convenience of explanation, the present disclosure discloses that the cover plate assembly 100 and the protective case assemble with each other to form a mobile phone protective case 1 to illustrate, but the present disclosure does not limit the cover plate assembly 100 and the protective case. That is, the cover plate assembly 100 and the protective case can be a mobile phone with an integrated design. The cover plate assembly 100 and the protective case can be a mobile phone protective case without being removable.

The power module 102 disposes on the lid portion 1002. The power module 102 implements through at least one battery to transmit and receive power. Wherein, the buttery can combine with a converting circuit, a switch circuit, a control circuit and/or a combination of one or more thereof. The above disclosure is not intended to limit the power module 102 of the present invention.

Figure 3:
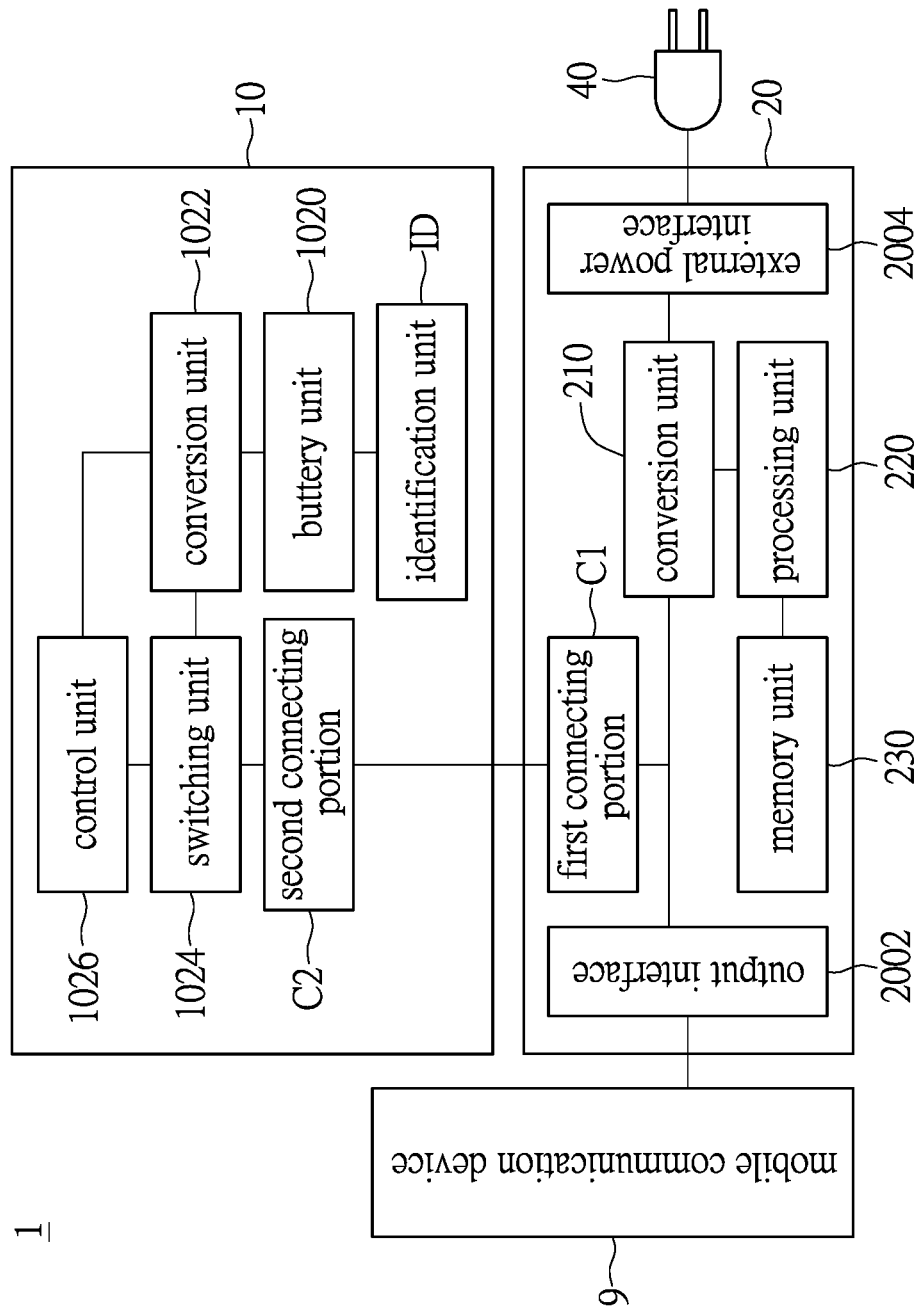
FIG. 3 is a functional block schematic diagram of a mobile protective case according to another exemplary embodiment of the instant disclosure.

FIG. 3 is a functional block schematic diagram of a mobile protective case according to another exemplary embodiment of the instant disclosure. Please refer to FIG. 3. There is a protective case, a power bank 10 and a mobile communication device 9. The power module 102 of the power bank 10 includes an identification unit ID, a buttery unit 1020, a conversion unit 1022, a switching unit 1024 and a control unit 1026. The buttery unit 1020 disposes on a lid portion 1002. The transforming unit 1022 electrically connects to the battery unit 1020, a switching unit 1024 and the control unit 1026. The switching unit 1024 electrically connects to a second connecting portion C2.

The identification unit ID is an identification chip. The identification unit ID electrically connects to the battery unit 1020. Or the identification unit ID disposes on the circuit or firmware of the battery unit 1020. Thus, the power module 102 has an identification code. Thereby, a processing unit 220 determines the authenticity of power bank 10 according to a personal identification number (PIN) information which is stored in a memory unit 230. When the processing unit 220 determines that the power bank 10 has a real identification code, the power bank 10 starts the power supply controlled by the processing unit 220. On the contrary, when the processing unit 220 determines that the power bank 10 does not have a real identification code, the power bank 10 stops the power supply controlled by the processing unit 220.

The battery unit 1020 implements through lithium batteries, nickel hydrogen batteries, nickel cadmium batteries or other batteries. The transforming unit 1022 is a direct current (DC) to direct current (DC) converting circuit which is implemented through a boost circuit, a buck circuit, buck-boost circuit and/or a combination of one or more thereof. The control unit 1026 implements through circuits of semiconductor electronic components, such as a control circuit, a processing circuit or an analyzing circuit. The switching unit 1024 has at least one transistor. The control unit 1026 is for controlling the switching unit 1024 switching on/off. The above disclosure is not intended to limit the battery unit 1020, the transforming unit 1022, the switching unit 1024 and the control unit 1026 of the present invention.

Additionally, in the other embodiments, the power module 102 further includes a protective unit which is implemented through a regulator circuit, a filter circuit, an over-charge protective circuit, an over-current protective circuit, an over-voltage protective circuit and/or a combination of one or more thereof. A person of ordinary skill in the art could design the power module 102 and the protective unit freely.

The operation mode of the power module 102 in the present embodiment differentiates in accordance with whether the mobile phone protective case 1 is assembled or not. Before the mobile phone protective case 1 is assembled, the power bank 10 and the protective case are individual elements operating independently. The second connecting portion C2 does not connect to the first connecting portion C1. Users use an external power source to charge the battery unit 1020 of the power bank 10 via the second connecting portion C2. Wherein, if the control unit 1026 determines that the external power source is in line with the electricity of the battery unit 1020, the control unit 1026 controls a charging circuit, connecting between the second connecting portion C2 and the battery unit 1020, to conduct.

After the mobile phone protective case 1 is assembled, the protective case and the power bank 10 are assembled with each other to form a mobile phone protective case 1. Since the second connecting portion C2 connects to the first connecting portion C1, the operation mode of the power module 102 differentiates in accordance with whether the mobile phone protective case 1 is connected to the external power source or not.

In the case where the external power interface 2004 is not electrically connected to the external power source, a power supply circuit from the second connecting portion C2 via the first connecting portion C1 and conversion unit 210 to the output interface 2002 is turned on, to make the mobile phone be charged by the battery unit 1020. In addition, a person of ordinary skill in the art can design a button switch or a toggle switch. When the second connecting portion C2 connects to the first connecting portion C1, the mobile phone starts to be charged by the battery unit 1020 via the user pressing the button switch or the toggle switch. The above disclosure is not intended to limit the operation mode of the power module 102.

The external power interface 2004 can electrically connect to the external power source. A power supply circuit coupling between the external power interface 2004 and the output interface 2002 is turned on. After the conversion unit 210 converts and regulates a commercial power source from the external power source, the output interface 2002 transmits the power to the mobile phone. Or another power supply circuit coupling between the external power interface 2004 and the first connecting portion C1 is turned on. Then, after the conversion unit 210 converts and regulates a commercial power source from the external power source, the external power interface 2004 transmits the power to the battery unit 1020. That is, the external power source charges the mobile phone, the battery unit 1020 and/or a combination of one or more thereof via the external power interface 2004.

When a user separately uses the battery unit 1020 of the cover plate assembly 100, the cover plate assembly 100 can be used as a power bank. Or, the cover plate assembly 100 charges the battery unit 1020 directly via the external power source. When a user separately uses the protective case, the protective case through the external power source can charge the mobile phone directly, since the cover plate assembly 100 and the protective case are assembled with each other. The battery unit 1020, the mobile phone and/or a combination of one or more thereof can be charged directly from the external power source. Or the battery unit 1020 supplies power to charge the mobile phone. The above disclosure is not intended to limit the mobile phone protective case 1 of the present invention.

Figure 4:
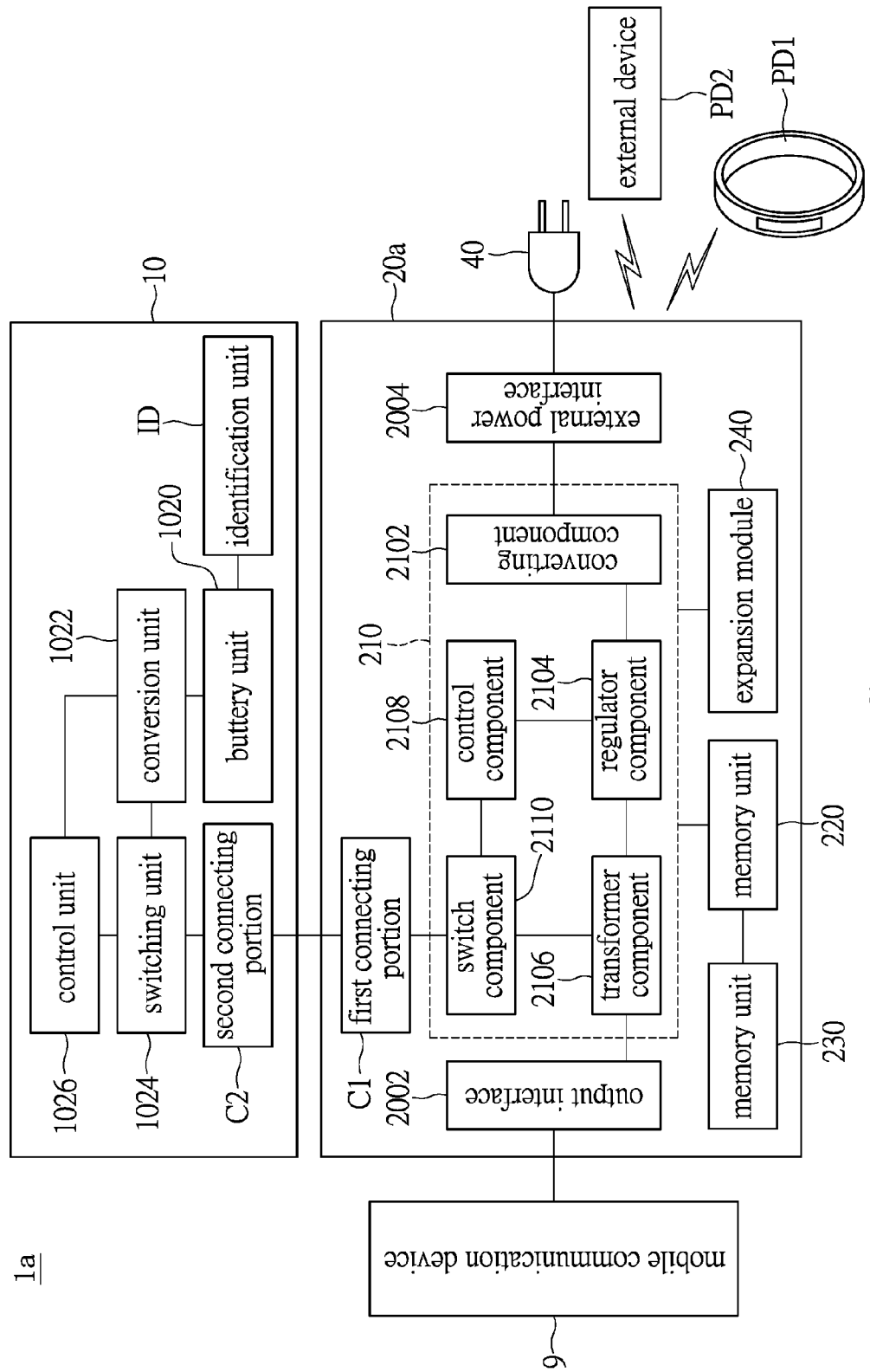
FIG. 4 is a schematic diagram of a mobile protective case according to another exemplary embodiment of the instant disclosure.

FIG. 4 is a schematic diagram of a mobile protective case according to another exemplary embodiment of the instant disclosure. As shown in FIG. 4, the mobile phone protective case 1a of the present embodiment is similar to the mobile phone protective case 1 of the above-mentioned embodiment in FIG. 3. However, there are differences between the protective case 1 and the protective case 1a. That is, the protective case further includes an expansion module 240. The expansion module 240 electrically connects to the conversion unit 210. The protective case through the expansion module 240 communicates with the external devices PD1-PD2. Wherein, the external devices PD1-PD2 are sport bracelets, wearable devices, laptop computers, sphygmomanometers, glucose meters (or glucometers), treadmills, smart refrigerators, intelligent appliance, or other devices. The above disclosure is not intended to limit the external device of the present invention.

The protective case obtains physiological information, work information and operating information recorded by the external devices PD1-PD2 via the expansion module 240. And the expansion module 240 transmits the above physiological information, work information and operating information to a smart phone. Or through the expansion module 240 the above physiological information, work information and operating information is recorded in a built-in memory. The above disclosure is not intended to limit the protective case of the present invention.

It is worth mentioning that the expansion module 240 is used to transmit information from at least a wearable device or an intelligent appliance to the smart phone. The expansion module 240 is used to communicate through a Wi-Fi communication device, a Bluetooth communication device or other communication devices.

The expansion module 240 communicates with the wearable device and the smart phone, and downloads personal information stored in the wearable device to the smart phone. That is, the expansion module 240 is such as a communication bridge between the external devices PD1-PD2 and the mobile communication device 9. The above disclosure is not intended to limit the expansion module 240 of the present invention.

Additionally, the expansion module 240 through a subscriber identity module (commonly known as a SIM card) or a control chip can be an extension of hardware, software or other accessories. And the expansion module 240 can install a smart accessory control module to communicate with the software. Thus, the smart ultra box 10 can be used in smart appliances, health management, wireless charging and security systems.

Substantively, users record their amount of exercise and sleep quality via the external device PD1, and sync with the memory unit 230 via the wireless communication component to wirelessly transmit fitness and sleep records of the external device PD1. Then, the memory unit 230 stores the fitness and sleep records. And the fitness and sleep records also transmit to the mobile communication device 9. Users get the fitness and sleep records from the memory unit 230 of the expansion module 240 via the mobile communication device 9.

The conversion unit 210 includes a converting component 2102, a regulator component 2104, a transformer component 2106, a control component 2108 and a switch component 2110 which is electrically connected to the control component 2108. Substantively, the converting component 2102 is electrically connected to the external power interface 2004 and the regulator component 2104. The transformer component 2106 is electrically connected to the output interface 2002 and the flexible printed circuit board FP. The switch component 2110 is electrically connected between the transformer component 2106 and the flexible printed circuit board FP. The control component 2108 is electrically connected to the regulator component 2104 or the transformer component 2106, and the control component 2108 is for controlling the switch component 2110 switching on/off.

The control component 2108 implements through circuits of semiconductor electronic components, such as a control circuit, a processing circuit or an analyzing circuit. The above disclosure is not intended to limit the control component 2108 of the present invention. Wherein, a working power of the control component 2108 comes from the regulator component 2104. However, in other embodiments, the working power of the control component 2108 comes from the transformer component 2106. A person of ordinary skill in the art could design the control component 2108 freely.

Additionally, in the present embodiment, the protective case further includes a power adapter 40. The power adapter 40 connects between the commercial power source and the external power interface 2004. The power adapter 40 has an alternating current (AC) to direct current (DC) converting circuit. The converting component 2102 is a direct current (DC) to direct current (DC) converting circuit which is implemented through a boost circuit, a buck circuit, buck-boost circuit and/or a combination of one or more thereof. The regulator component 2104 is a voltage regulator circuit or a filter circuit. The transformer component 2106 is a voltage transformer circuit. In other embodiments, the converting component 2102 is an alternating current (AC) to direct current (DC) converting circuit, and converts an alternating current power to a direct current power. The above disclosure is not intended to limit the converting component 2102, the regulator component 2104 and the transformer component 2106 of the present invention.

The conversion unit 210 further includes a protective component which is implemented through an over-charge protective circuit, an over-current protective circuit, an over-voltage protective circuit and/or a combination of one or more thereof. The above disclosure is not intended to limit the protective component of the present invention.

When the protective case has been electrically connected to an external power source such as a commercial power source, the external power source enters the conversion unit 210 via the power adapter 40 and the external power interface 2004. Wherein, the conversion unit 210 converts the alternating current power to a direct current power. After the regulator component 2104 regulates the direct current power, the direct current power is transmitted to the transformer component 2106. Then, the direct current power outputs to a smart phone via the output interface 2002. In addition, the direct current power outputs to a power bank 10 via the connecting portion C1.

Additionally, the conversion unit 210 includes a battery. The battery stores power and supplies power to the expansion module 240. In other embodiments, the conversion unit 210 does not include the battery, so that the conversion unit 210 supplies power to the expansion module 240 from the power bank 10 or an external power source. The above disclosure is not intended to limit the conversion unit 210 of the present invention. Except for the above differences, relevant details of the operations for the smart ultra box and protective case thereof are described in the embodiments of FIGS. 1-3, and thus are not repeated.

To sum up, the instant disclosure provides a smart ultra box, a protective case with the same ultra box and a mobile phone protective case. When users separately use the battery unit of the cover plate assembly, the cover plate assembly can be used as a power bank. When users separately use the protective case, the protective case through the external power source can charge the mobile phone directly. When the cover plate assembly and the protective case are assembled with each other, the battery unit and the mobile phone can be charged directly from the external power source. Or the battery unit supplies power to charge the mobile phone. Additionally, due to the battery unit of the cover plate assembly providing long-term and stable power to the mobile communication device, the mobile communication device can avoid damage from overheating. As a result, the present disclosure really enhances the ease of operation, efficiency and quality of the smart ultra box and its protective case.

The descriptions illustrated supra set forth simply the preferred embodiments of the instant disclosure; however, the characteristics of the instant disclosure are by no means restricted thereto. All changes, alterations, or modifications conveniently considered by those skilled in the art are deemed to be encompassed within the scope of the instant disclosure delineated by the following claims.

What is claimed is:

1. A smart ultra box, adapted to a protective case protecting a mobile communication device, the ultra box comprising:
   a main body;
   a conversion unit, disposed on the main body;
   a flexible printed circuit board, electrically connected to the conversion unit, the flexible printed circuit board extending outwardly from the main body;
   a processing unit, disposed on the main body, electrically connected to the conversion unit; and
   a memory unit, disposed on the main body, electrically connected to the processing unit, the memory unit storing at least one personal identification number (PIN) information;
   a first connecting porting, connected to a terminal of the flexible printed circuit board;
   wherein the protective case and a power bank are assembled with each other to form a mobile phone protective case, the power bank having an identification unit for covering a display screen of the mobile communication device being accommodated in the mobile phone protective case; the power bank having a second connecting portion;
   wherein the power bank comprises a folded portion and a lid portion connected with the folded portion, the lid portion is used to cover the display screen, and the folded portion is for connecting between the lid portion and the protective case;

wherein, when the protective case and the power bank assemble with each other, the ultra box according to the PIN information determines whether the identification unit is a real identification code of the processing unit, if the identification unit is determined not to be the real identification code, the power bank stops power supply by the processing unit controlled in response to the determination order, if the identification unit is determined to be the real identification code, the power bank starts power supply by the processing unit controlled in response to the determination order;

wherein the main body comprises an output interface and an external power interface, the external power interface receives a commercial power source, the conversion unit converts the commercial power source into a first electric power and a second electric power, the output interface outputs the first electric power, and the flexible printed circuit board transmits the second electric power to the power bank through the first connecting portion;

wherein when the identification unit is determined to be the real identification code, the power bank provide power supply to the ultra box through the second connecting portion which connected with the first connected portion.

2. The smart ultra box according to claim 1, wherein the conversion unit electrically connects to the output interface and the external power interface, the conversion unit comprises a converting component, a regulator component and a transformer component, said converting component is electrically connected to the external power interface and said regulator component, and said transformer component is electrically connected to the power output interface and the flexible printed circuit board.

3. The smart ultra box according to claim 2, wherein the conversion unit further comprises a control component and a switch component which is electrically connected to the control component, the switch component is electrically connected between the transformer component and the flexible printed circuit board, the control component is electrically connected to the regulator component or the transformer component, and the control component is for controlling the switch component switching on/off.

4. The smart ultra box according to claim 2, further comprising a power adapter, the power adapter connected between the commercial power source and the external power interface, wherein the power adapter having an alternating current (AC) to direct current (DC) converting circuit, and the converting component is a direct current (DC) to direct current (DC) converting circuit, the regulator component is a voltage regulator circuit and the transformer component is a voltage transformer circuit.

5. The smart ultra box according to claim 4, wherein the direct current (DC) to direct current (DC) converting circuit is a boost circuit, a buck circuit, buck-boost circuit and/or a combination of one or more thereof.

6. The smart ultra box according to claim 2, wherein the converting component is an alternating current (AC) to direct current (DC) converting circuit, and the regulator component is a voltage regulator circuit, and the transformer component is a voltage transformer circuit.

7. The smart ultra box according to claim 1, further comprising an expansion module, for transmitting at least one information of an external device to the mobile communication device;

wherein the expansion module electrically connected to the conversion unit, the protective case through the expansion module communicates with a plurality of external devices, the plurality of external devices are as sport bracelets, wearable devices, laptop computers, sphygmomanometers, glucose meters, treadmills, smart refrigerators or intelligent appliance.

8. A protective case, to protect a mobile communication device, the protective case comprising:
an accommodating portion, to house the mobile communication device; and a smart ultra box as claimed in claim 1 in which the ultra box disposes on an c side of the accommodating portion;
wherein the protective case and a power bank as claimed in claim 1 are assembled with each other to form a mobile phone protective case, the power bank having identification unit for covering a display screen of the mobile communication de being accommodated in the mobile phone protective case.

9. The protective case according to claim 8, further comprising a bottom plate portion, wherein the bottom plate portion is an outer casing of the protective case, the flexible printed circuit board extends to a first connecting portion from the outer casing, and a terminal of the flexible printed circuit board electrically connects to the first connecting portion, the first connecting portion electrically connects to a mobile power supply device.

10. The protective case according to claim 8, wherein the main body of the ultra box and the accommodating portion is an integrated design, the output interface disposes on an inner side of the accommodating portion, and the external power interface disposes on the outer side of the accommodating portion.

11. A mobile phone protective case, protecting a mobile communication device, the mobile phone protective case comprising:
a protective case, having an accommodating portion and a first connecting portion, the accommodating portion to house the mobile communication device;
a power bank as claimed in claim 1, assembled with the protective case; and a smart ultra box as claimed in claim 1 in which the ultra box disposes on an side of the accommodating portion;
wherein the protective case and a the power bank are assembled with each other to form a mobile phone protective case, the power bank having an identification unit covering a display screen of the mobile communication device being accommodated the mobile phone protective case.

12. The protective case according to claim 11, wherein the power bank further comprising:
a cover plate assembly, having a lid portion, a folded portion and a second connecting portion, the folded portion connected between the lid portion and the second connecting portion; and
a power module, configured to the cover plate assembly;
wherein the cover plate assembly is for assembling with the protective case.

* * * * *